July 3, 1962    W. F. WILES ETAL    3,042,342
VERTICAL TAKE-OFF AIRCRAFT
Filed Aug. 8, 1960    2 Sheets-Sheet 2
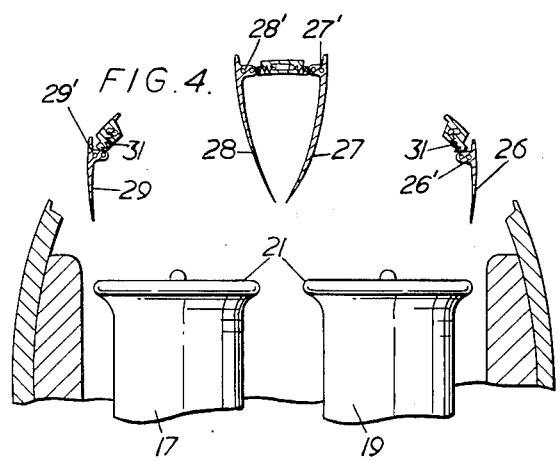
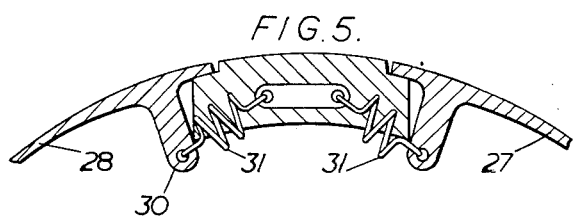

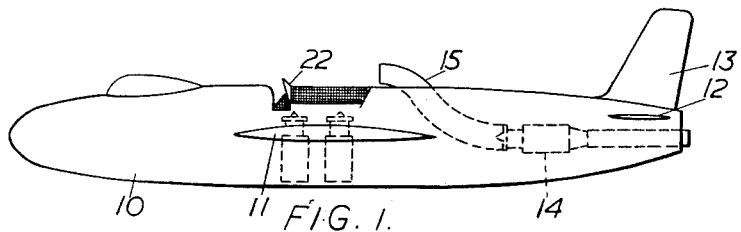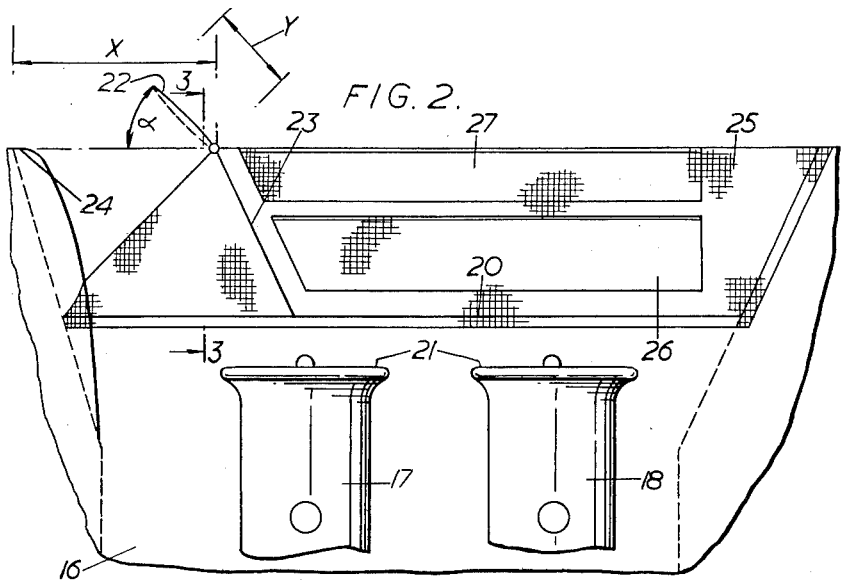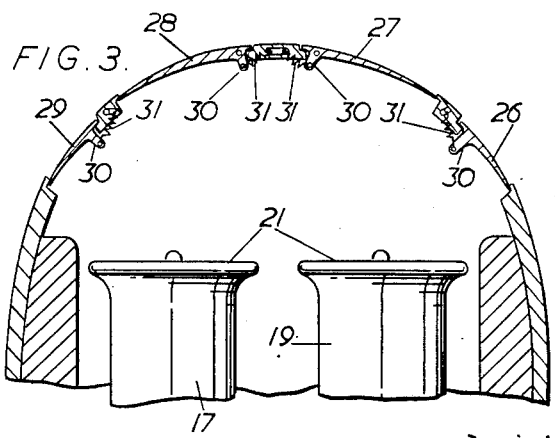

United States Patent Office 3,042,342
Patented July 3, 1962

3,042,342
William Francis Wiles, Linby, and John Roland Evans, Spondon, Derby, England, assignors to Rolls-Royce Limited, Derby, England, a British company
Filed Aug. 8, 1960, Ser. No. 47,966
Claims priority, application Great Britain Aug. 24, 1959
6 Claims. (Cl. 244—23)

This invention concerns improvements in and relating to vertical take-off aircraft.

Vertical take-off aircraft may employ vertically arranged or vertically arrangeable gas turbine engines which provide lift forces independent of those generated aerodynamically by forward flight of the aircraft. An object of the present invention is to provide apparatus which will facilitate the starting of such gas turbine engines by means of ram air, i.e. air pressurised by the forward movement of the aircraft.

According to the present invention there is provided an engine compartment adapted to form part of a vertical take-off aircraft, said compartment having mounted therein at least one vertically arranged or vertically arrangeable gas turbine engine and the compartment having an aperture above the engine air intake, a scoop mounted adjacent one end of the aperture, said scoop being adapted to direct ram air through a portion of said aperture and into said air intake, and at least one door adapted in one position to close the remainder of the aperture and in another position to open the remainder of the aperture so as to allow vertical entry of air therethrough.

The invention also comprises a vertical take-off aircraft having an engine compartment within which there is mounted at least one vertically arranged or vertically arrangeable gas turbine engine, said compartment having an aperture above the engine air intake, a forwardly directed scoop mounted adjacent the forward end of the aperture and positioned to direct ram air into the air intake, and at least one door adapted in one position to close the remainder of the aperture and in another position to open the remainder of the aperture so as to allow vertical entry of air therethrough.

Preferably there are means for urging the door towards the closed position, the door being arranged to be forced open by the intake suction when the latter reaches a predetermined level.

The door is preferably urged towards its closed position by a weak spring so that the door may be rapidly opened without a large build up of spring pressure to resist such opening.

The door is preferably in the form of a number of longitudinally extending pivotally mounted flaps. Thus the arrangement may be such that the flaps automatically open inwardly when the engine speed reaches a level at which intake suction is sufficiently high.

Preferably the scoop is adapted to be set when required at an angle of substantially 20°–25° (e.g. 22½°) to the horizontal, and has its rearward end disposed about three times its own width from the forward end of the aperture.

The whole of the aperture may be covered with gauze or other reticulated material to provide a debris guard.

The invention is illustrated, merely by way of example, in the accompanying drawings, in which:

FIGURE 1 is a side elevation of a vertical take-off aircraft incorporating the invention;

FIGURE 2 is an enlarged section through an engine compartment containing vertical take-off engines of said aircraft;

FIGURE 3, which is a section on the line 3—3 of FIGURE 2, shows a portion of said engine compartment with its doors in a closed position;

FIGURE 4 is a view similar to FIGURE 3, but showing the doors in an open position; and FIGURE 5 is an enlarged section through the doors to show the spring mechanism in detail.

The vertical take off aircraft shown in FIGURE 1 has a fuselage 10, a wing 11, a tail plane 12 and a fin 13. The aircraft has a forward propulsion gas turbine engine 14 which is supplied with air by ducts 15. The aircraft also has an engine compartment 16 (FIGURE 2) within which are mounted four small gas turbine engines three of which are shown at 17, 18, 19. The engines in the compartment 16 are vertically arranged to provide direct vertical thrust for vertical take-off and landing.

The compartment 16 has an aperture 20 disposed above the engines 17–19, the aperture 20 providing for the inflow of air into the engine air intakes 21. Adjacent the forward end of aperture 20 is a scoop 22. The scoop 22 is shown in FIGURES 1 and 2 in the raised position in which it is placed during vertical take-off and landing so that it will deflect air into the intakes 21. During forward flight, however, the engines 17–19 will not be in use and the scoop 22 will therefore be retracted (by means not shown) so as to lie against structure 23 in which it will cover part of the aperture 20.

The rear edge of the scoop 22 is positioned at a distance X from the forward edge 24 of the aperture 20, the distance X being about three times the width Y of the scoop. For example, the dimensions X and Y may be respectively 24″ and 10″. The angle α between the scoop 22, when the latter is in the raised position shown in FIGURE 2, and the horizontal could be about 45° but is preferably about 22½°.

The whole of the aperture 20 is covered by a wire gauze 25 which has been omitted from FIGURES 3–5 for clarity. The gauze may be of mesh size 1q. (i.e. its dimensions may be 8 meshes per linear inch x 8 meshes per linear inch utilizing wire of 0.024 inch diameter. Alternatively, and preferably the wire gauze 25 is 14 meshes per linear inch x 14 meshes per linear inches utilizing wire of 0.016 inch diameter.

The portion of the aperture 20 aft of scoop 22 is closed by four longitudinally pivoted flap-like doors 26, 27, 28, 29 having pivoting axes 26′, 27′, 28′ and 29′ respectively. Each door has associated with it an arm 30 whose inner end is connected by a spring 31 to a fixed part of the compartment 16, the springs 31 being in compression so that they exert sufficient force to hold each of the doors closed normally. This construction is best shown in FIGURE 5.

With the vertical take-off engines 17–19 inoperative, the doors 26–29 are held closed by their springs 31. When, however, the vertical take-off engines are brought into service during forward flight of the aircraft, ram air enters the compartment 16 through the forward part of the aperture 20, which is open, and the ram air is deflected into the engine intakes 21 by the scoop 22.

As the engine speed up, the intake suction created by the engines increases until it reaches a level at which it will overcome the force of the springs 31. The springs 31 are weak and consequently the doors 26–29 rapidly move inwardly to the position shown in FIGURE 4.

Air can now enter the intakes of the engines 17–19 via the remainder of the aperture 20.

When the engines 17–19 are no longer required, the doors 26–29 are automatically closed again as soon as the speed of the engines 17—19 reaches a level at which the intake suction is incapable of overcoming the force exerted by springs 31.

The provision of the doors 26–29 which remain closed until the intake suction has risen sufficiently reduces the fall off in ram efficiency which would otherwise occur with increasing engine mass flow. By "ram efficiency" is meant the ratio of the pressure of the air when it actually enters the compartment 16 to the ram pressure. It can be shown that the ram efficiency decreases with increase in the rate of air flow into the compartment 16. As the speed of the engines 17–19 increases, the rate of air flow into the compartment 16, due to intake suction, will of course also increase with a resulting decrease in ram efficiency. However, when the intake suction has reached a predetermined value, the doors 26–29 open so as to reduce the velocity of the ram air flowing into the compartment 16 and hence reduce the fall off in ram efficiency.

Although in the drawings only four doors 26–29 are shown, it is in practice referred to use a larger number (e.g. twelve) of small doors.

We claim:

1. In an engine compartment adapted to form part of a vertical take-off aircraft: at least one vertically arranged gas turbine engine mounted in the compartment; a fixed structure extending across the top of the compartment, said fixed structure defining aperture means directly above the engine air intake; closure means mounted on said fixed structure and movable between a closed position in which said aperture means is closed and an open position in which vertical entry of air is allowed through said aperture means; means defining an orifice located forwardly of said fixed structure; a scoop movable independently of said closure means to a position in which it projects outwardly of said fixed structure at the rearward end of said orifice, said scoop being adapted to direct ram air through said orifice and into the engine air intake when said closure means is in said closed position, said scoop having an effective cross-sectional area projecting outwardly of said fixed structure and seen looking horizontally which is substantially less than the effective cross-sectional area of said orifice.

2. In a vertical take-off aircraft: an engine compartment; at least one vertically arranged gas turbine engine mounted in said compartment; a fixed structure extending across the top of said compartment, said fixed structure defining aperture means directly above the engine air intake; closure means mounted on said fixed structure and movable between a closed position in which said aperture means is closed and an open position in which a vertical entry of air is allowed through said aperture means, said closure means being arranged to be open inwardly of said fixed structure when suction in said compartment reaches a predetermined level; means defining an orifice located forwardly of said fixed structure; a scoop movable independently of said closure means to a position projecting outwardly of said fixed structure at the rearward end of said orifice, said scoop being adapted to direct ram air through said orifice and into the engine air intake when said closure means is in closed position, said scoop having an effective cross-sectional area projecting outwardly of said fixed structure and seen looking horizontally which is substantially less than the effective cross-sectional area of said orifice.

3. A vertical take-off aircraft as claimed in claim 2 including spring means for urging said closure means to said closed position.

4. In a vertical take-off aircraft: an engine compartment; at least one vertically arranged gas turbine engine mounted in said compartment, a fixed structure extending across the top of said compartment, said fixed structure defining aperture means directly above the engine air intake; closure means mounted on said fixed structure and movable between a closed position in which said aperture means is closed and an open position in which vertical entry of air is allowed through said aperture means; means defining an orifice located forwardly of said fixed structure; a scoop movable independently of said closure means to a position in which it projects outwardly of said fixed structure at the rearward end of said orifice at an angle of from 20° to 25° to the horizontal, said scoop being adapted to direct ram air through said orifice and into the engine air intake, said scoop having an effective cross-sectional area projecting outwardly of said fixed structure and seen looking horizontally which is substantially less than the effective cross-sectional area of said orifice.

5. In a vertical take-off aircraft: an engine compartment; at least one vertically arranged gas turbine engine mounted in said compartment; a fixed structure extending across the top of said compartment, said fixed structure defining aperture means directly above the engine air intake; closure means mounted on said fixed structure and movable between a closed position in which said aperture means is closed and an open position in which vertical entry of air is allowed through said aperture means; means defining an orifice located forwardly of said fixed structure; a scoop movable independently of said closure means to a position in which it projects outwardly of said fixed structure at the rearward end of said orifice, said scoop being adapted to direct ram air through said orifice and into the engine air intake, the rearward end of the scoop being disposed at substantially three times the scoop's width from the forward end of the orifice, said scoop having an effective cross-sectional area projecting outwardly of said fixed structure and seen looking horizontally which is substantially less than the effective cross-sectional area of said orifice.

6. In a vertical take-off aircraft: an engine compartment; at least one vertically arranged gas turbine engine mounted in said compartment; a fixed structure extending across the top of said compartment, said fixed structure defining aperture means directly above the engine air intake; closure means mounted on said fixed structure and movable between a closed position in which said aperture means is closed and an open position in which vertical entry of air is allowed through said aperture means; means defining an orifice located forwardly of said fixed structure; reticulated material covering said aperture means and said orifice to form a debris guard; a scoop movable independently of said closure means to a position in which it projects outwardly of said fixed structure at the rearward end of said orifice, said scoop being adapted to direct ram air through said orifice and into the engine air intake, said scoop having an effective cross-sectional area of projecting outwardly of said fixed structure and seen looking horizontally which is substantially less than the effective cross-sectional area of said orifice.

References Cited in the file of this patent

UNITED STATES PATENTS

| | | |
|---|---|---|
| 2,788,184 | Michael | Apr. 9, 1957 |
| 2,969,941 | Hobart | Jan. 31, 1961 |

FOREIGN PATENTS

| | | |
|---|---|---|
| 217,315 | Australia | Oct. 9, 1958 |